United States Patent
Gomolski (10) Patent No.: US 10,150,602 B1
(45) Date of Patent: Dec. 11, 2018

(54) FLEXIBLE, LOCKABLE CARGO COVERS AND CONTAINERS

(71) Applicant: GoHide, LLC, Denver, CO (US)

(72) Inventor: Kevin Gomolski, Denver, CO (US)

( * ) Notice: Subject to any disclaimer, the term of this patent is extended or adjusted under 35 U.S.C. 154(b) by 502 days.

(21) Appl. No.: 14/712,690

(22) Filed: May 14, 2015

Related U.S. Application Data (60) Provisional application No. 61/996,838, filed on May 14, 2014.

(51) Int. Cl.
| | |
|---|---|
| *B65D 65/22* | (2006.01) |
| *B65D 65/08* | (2006.01) |
| *B65D 65/04* | (2006.01) |
| *B65D 65/02* | (2006.01) |
| *B60P 7/04* | (2006.01) |

(52) U.S. Cl.
CPC .............. *B65D 65/08* (2013.01); *B60P 7/04* (2013.01); *B65D 65/02* (2013.01); *B65D 65/04* (2013.01)

(58) Field of Classification Search
CPC ...... B65D 81/3886; B65D 25/34; A61G 5/10; B62D 1/06; E04G 21/30
USPC ............... 150/154, 167; 296/100.15, 100.16, 296/24.43; 220/287, 326; 410/118, 97
See application file for complete search history.

(56) References Cited

U.S. PATENT DOCUMENTS

| | | | | |
|---|---|---|---|---|
| 2,887,154 | A * | 5/1959 | Morningstar | A47G 5/00 126/299 C |
| 5,213,874 | A * | 5/1993 | Prudhomme | B32B 27/12 428/198 |
| 6,206,454 | B1 | 3/2001 | Cory | |
| 7,025,404 | B1 | 4/2006 | Gilbert | |
| 8,921,242 | B2 * | 12/2014 | Pesta | E04H 4/10 4/498 |
| 8,973,969 | B1 * | 3/2015 | Potter | B60P 7/0876 296/100.15 |
| 9,061,572 | B2 * | 6/2015 | Potter | B60J 7/104 |
| 9,283,413 | B2 * | 3/2016 | Weber | A62C 2/10 |
| 2006/0273615 | A1 * | 12/2006 | Ricks, Jr. | B60P 7/0876 296/100.16 |
| 2014/0076472 | A1 * | 3/2014 | Serlachius | B63B 17/02 150/154 |
| 2014/0355910 | A1 * | 12/2014 | Ferris | B65D 33/00 383/105 |

FOREIGN PATENT DOCUMENTS

EP   0 280 441   9/1990

* cited by examiner

*Primary Examiner* — Fenn C Mathew
*Assistant Examiner* — Cynthia Collado
(74) *Attorney, Agent, or Firm* — Reilly Intellectual Property Law Firm (57) ABSTRACT

A secure flexible and lockable container or cover in which to store items, keep items out of sight or to protect the items being covered and adaptable for use in vehicles comprising a multi-layered sheet which includes an intermediate mesh-like theft-proof layer having an outer surrounding adjustable cable with a locking mechanism, one or more tension anchors to secure the unit in place to a fixed article, a locking mechanism, an anchor mounting platform and cable stays.

20 Claims, 11 Drawing Sheets

FLEXIBLE, LOCKABLE CARGO COVERS AND CONTAINERS

The present application is a utility conversion of provisional patent application Ser. No. 61/996,838 filed 14 May 2014, for FLEXIBLE, LOCKABLE CARGO COVERS AND CONTAINERS and incorporated by reference herein.

The following relates to a secure flexible and lockable container or cover and more particularly relates to a secure flexible and lockable container or cover in which to store items, keep items out of sight or to protect the items being covered. There has been devised a security device which is adaptable for use in vehicles and can also be utilized as a container or bag which functions as a backpack or used in place of a traditional cargo cover to cover and lock items or for use in a motor vehicle in order to protect items from theft as well as from environmental conditions. Broadly this can be achieved in an article of manufacture that will have anywhere from two to five main components, namely: a multi-layered sheet which includes an intermediate mesh-like theft-proof layer having an outer surrounding adjustable cable with a locking mechanism, one or more tension anchors to secure the unit in place to a fixed article, such as, a cargo compartment of a motor vehicle, a locking mechanism, anchor mounts and cable stays.

DETAILED DESCRIPTION

Figure 1:
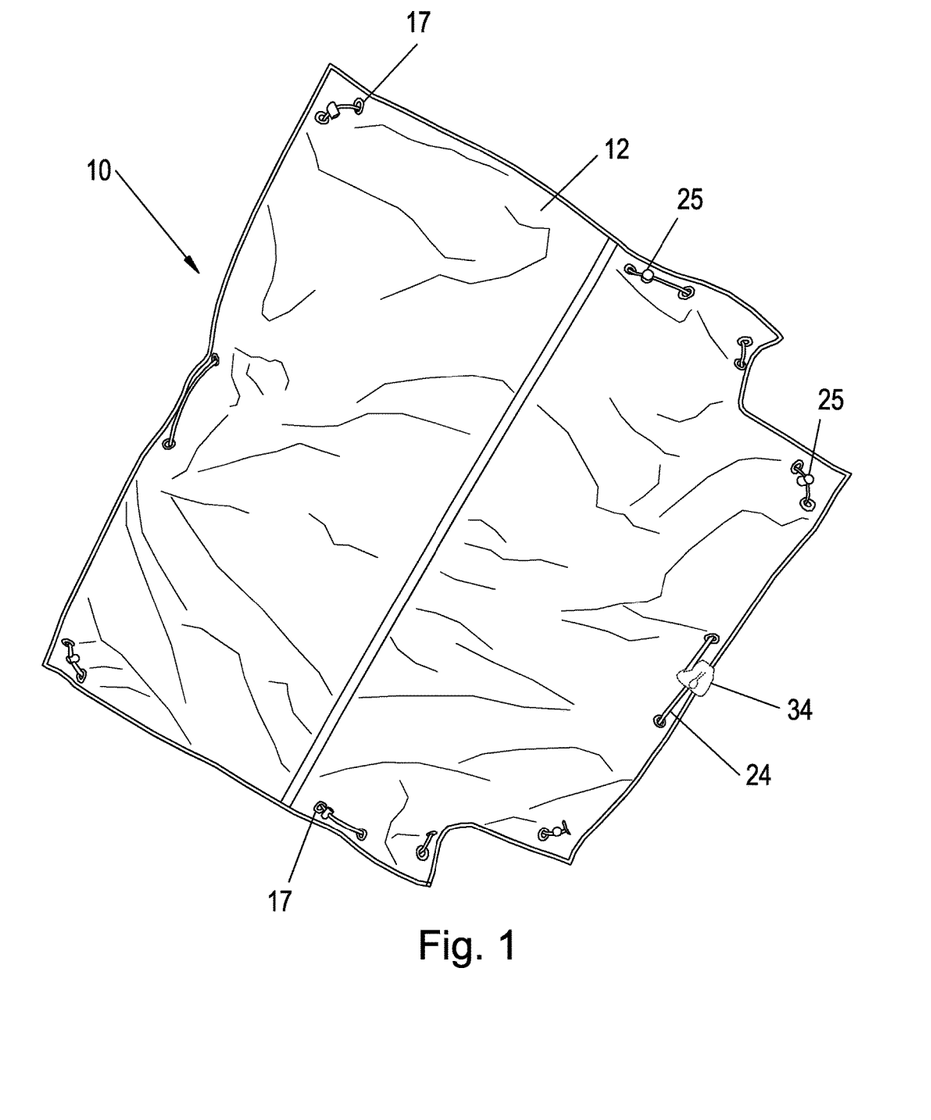
FIG. 1 is a perspective view of a first form of cargo cover assembly.
Figure 1A:
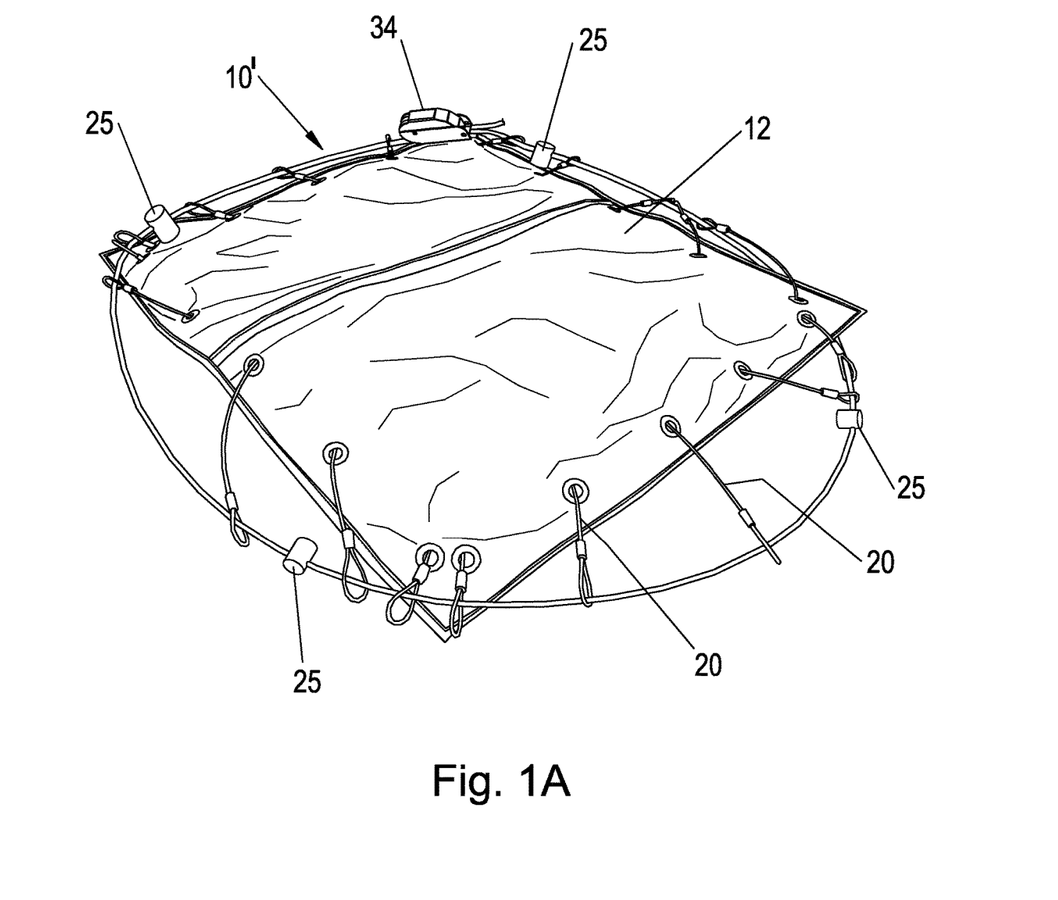
FIG. 1A is a perspective view of an alternate form of cargo cover assembly.
Figure 2:
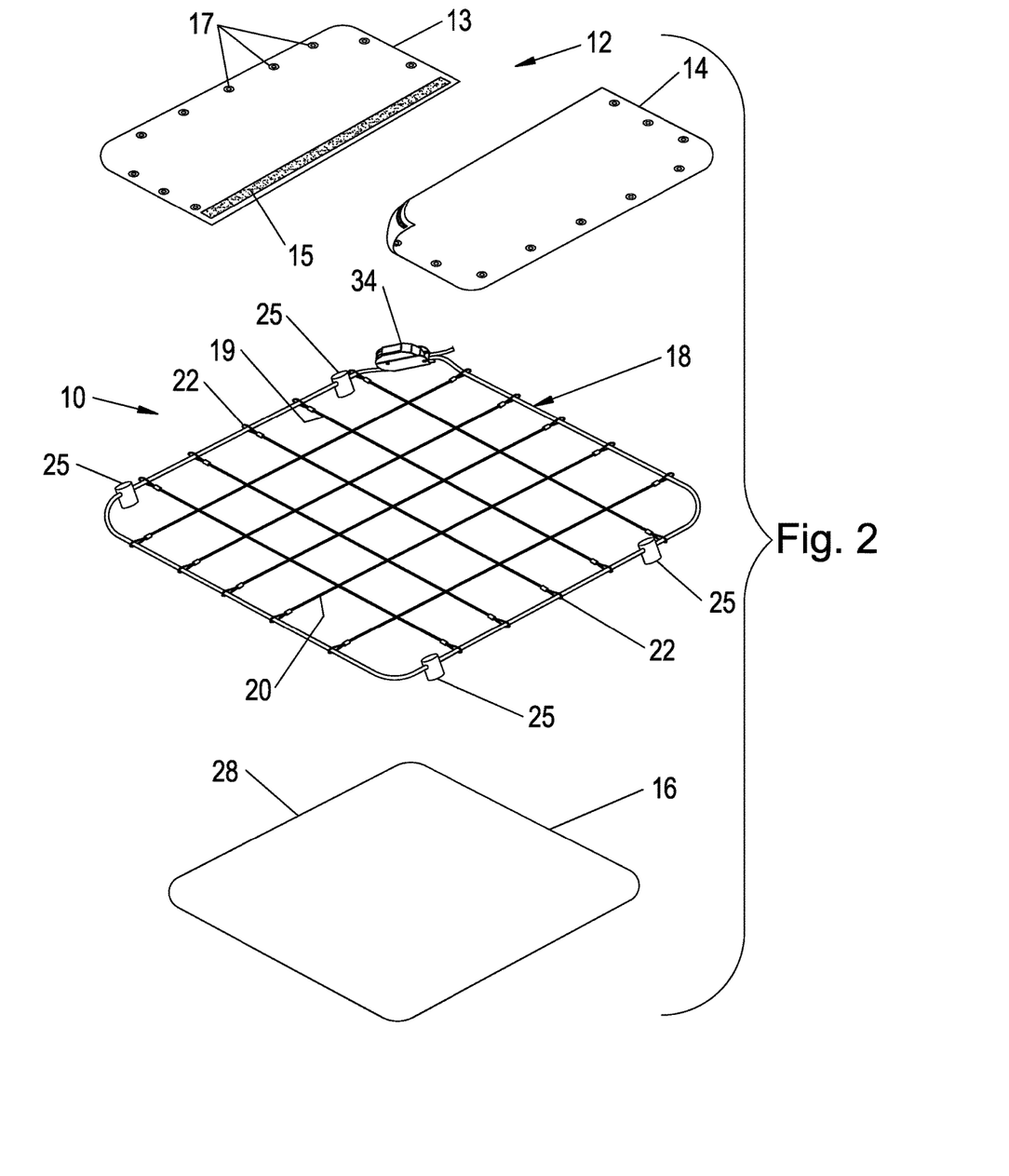
FIG. 2 is an exploded view of the layers making up the cargo cover assembly of FIGS. 1 and 1A.
Figure 2A:
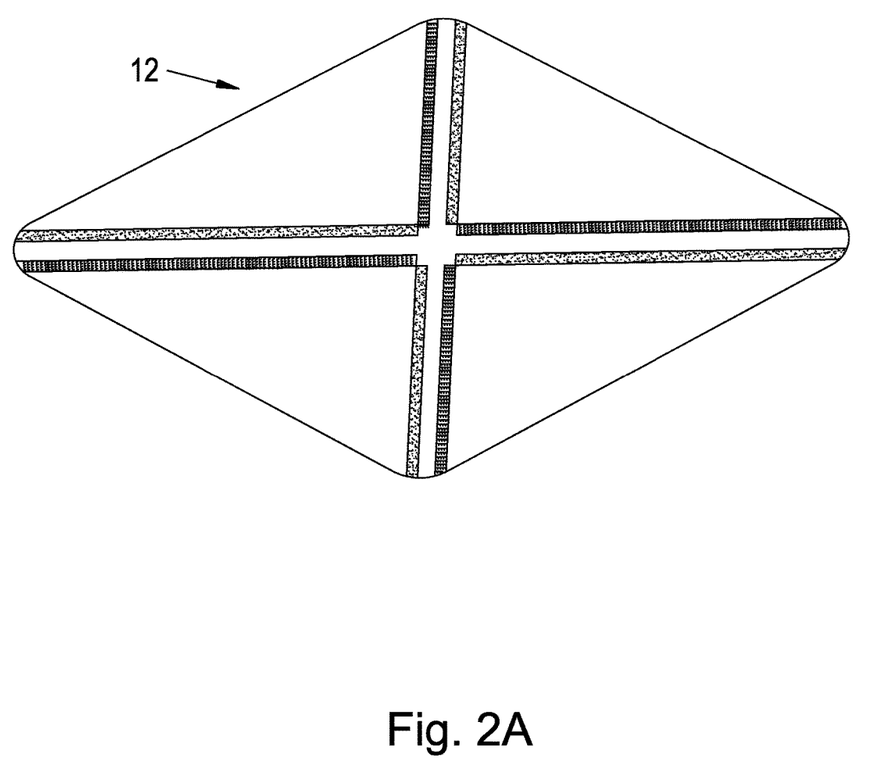
FIG. 2A is a perspective view of an alternate form of the cargo cover layer.

First and second embodiments are illustrated in FIGS. 1-5, comprising a cover assembly 10 or 10' which is made up of an inner layer 12 consisting of two sections 13 and 14 secured together by a hook and loop fastening seam or Velcro® 15 between the inner edges as shown in FIG. 2; an outer layer 16 also of generally rectangular configuration and composed of a durable material on the outer layer 16 and a soft felt-like or canvas material on the internal surface. The inner and outer layers 12 and 16 are joined together along their outer edges and may be sewn together. The inner layer 12 may have a hook and loop fastening seam 28 along one side to permit the security layer 18 to be inserted between the layers 12 and 16. Alternatively, the inner layer 12 may have spaced hook and loop fastening seams to facilitate placement of the security layer as shown in FIG. 2A. The inner layer 12 has grommets 17 around the border to allow extensions 19 of the middle security layer 18 to extend beyond the inner and outer layers 12 and 16 as shown in FIG. 1A. The inner layer may also be contained almost entirely within the outer layers 16 and 12 with only the tension cable 24 exiting through the grommets as shown in FIG. 1. The intermediate security layer 18 is preferably formed of intersecting wires or cables 19 and 20, the outer end of each length of cable 19 and 20 having a looped end 22 through which an outer surrounding tension cable 24 is threaded. In vehicle applications, anchor nuts 25 are arranged at spaced intervals around the border wire or cable 24 and in a manner to be described would typically be positioned at or adjacent to the corners of the security layer 18. In stand-alone cargo cover applications, tension anchors and bolts are not needed.

Figures 3, 3A:
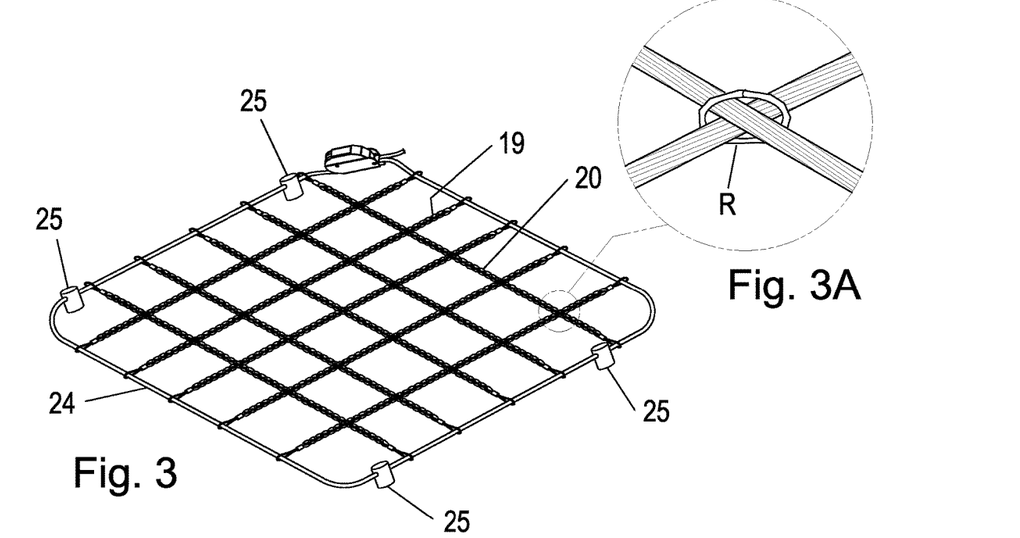
FIG. 3 is a perspective view in more detail of the intermediate layer of the cargo cover of FIG. 1.
FIG. 3A is a view in detail of one of the intersections of the layer of FIG. 3.
Figure 4:
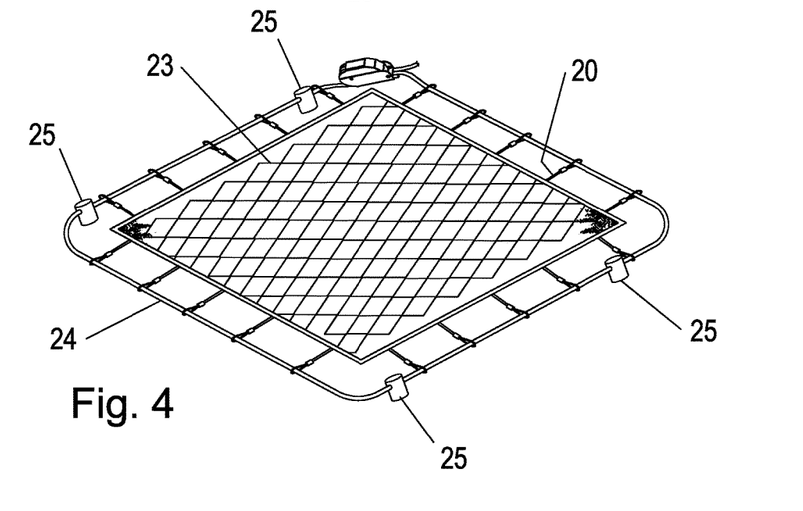
FIG. 4 is another perspective view of a modified form of layer to that of FIG. 3.

The security layer 18 may be made up of many materials other than those illustrated to resist cutting action of knives, shears, wire cutters or pliers. Common materials for the security layer 18 include interlocking strands of wire rope (also referred to as aircraft cable), chain, and various cut-resistant and stab-resistant fabrics 23 of sufficient flexibility or resilience to provide for a flexible cover when assembled, such as, shown in FIG. 4. In addition, wire clips or hog rings R are crimped onto the wires 19 and 20 at their points of intersection to prevent shifting between the wires as shown in FIGS. 3 and 3A.

Once the security layer 18 is inserted into the pocket formed between the inner and outer layers 12 and 16, the eyelets or loops 22 of the security layer may exit the borders through the grommets 17 built into the inner layer 12. Or as previously mentioned, some applications allow for the security layer looped ends 22 to remain within the interior of the outer layers 12 and 16. In this application, only the tension cable 24 is threaded through the grommets 17 as shown in FIG. 1. In addition, once the outside tension cable or wire 24 of the security layer 18 is threaded through the looped ends 22, the cable free ends 31 and 32 extend through a locking mechanism 34 as illustrated in FIGS. 11-14 and which in a manner to be described, provides the user with the ability to tighten and lock the assembled layers 12, 16 and 18 around different articles stored on a truck bed or other storage area. For example, when used as a cargo cover in the rear, open storage area of a Jeep® or pickup truck, as shown in FIG. 5, the lock assembly 34 may be bolted into the frame surrounding the tail gate portion of the vehicle as described in more detail in conjunction with its mounting as a cargo cover.

Figure 5:
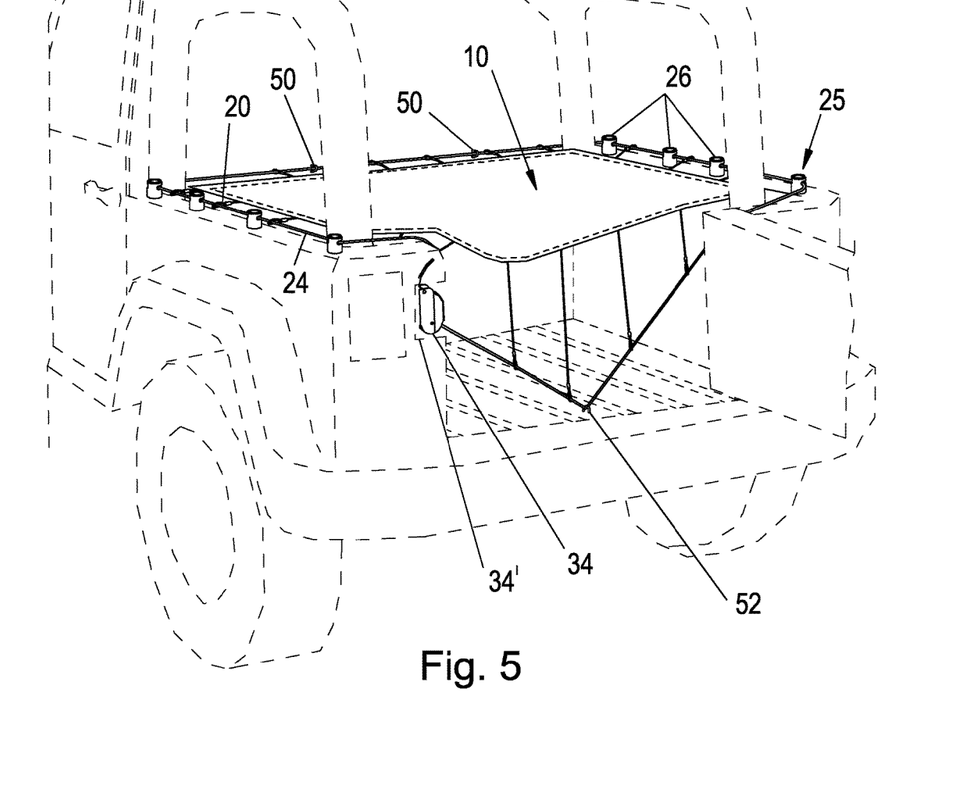
FIG. 5 is a perspective view illustrating a typical manner in which the cover of FIG. 1 is mounted in a cargo bed of a motor vehicle.

As best seen in FIGS. 6-10 in conjunction with FIG. 5, the tension anchors 26 are mounted at spaced intervals along the side walls S of a vehicle and are representative of various connectors that may be utilized to secure the cover to a vehicle, mount, rack or other object. Each tension anchor 26 is comprised of a hollow cylinder 40 having diametrically opposed vertical slots 42 terminating in radially extending slots 44 which extend in opposite directions. The anchor base is affixed to the vehicle with a bolt 46 which extends downwardly through an upper ledge of the side wall S of the vehicle and threaded through a rectangular nut 48, or a T-joint can be used to lock the anchor against rotation. The cable 24 is threaded through an anchor nut or bolt 25 and inserted downwardly through the slot 42 and then rotated through the slot 44 into a fixed or "closed" position. Under tension, the cable cannot be rotated back to the open position once the cable is tightened in place.

Figure 6:
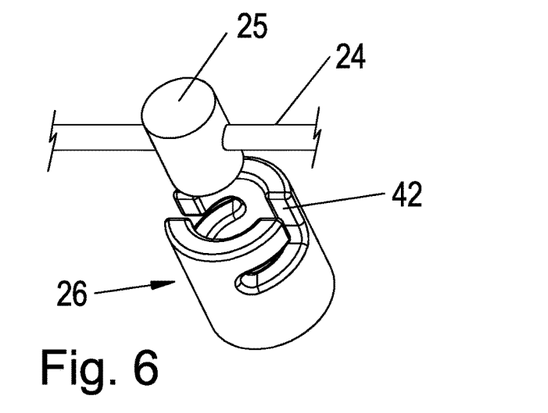
FIG. 6 is a perspective view of one form of an anchor base and an anchor nut inserted on a tension cable.
Figure 7:
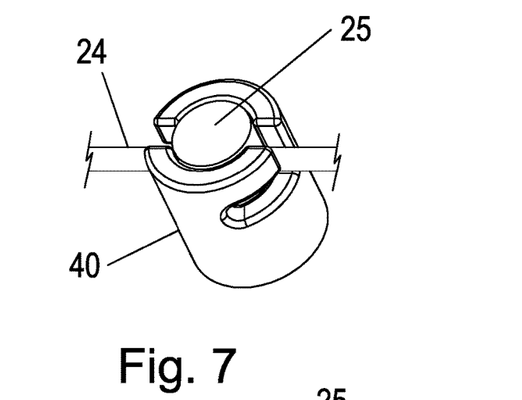
FIG. 7 is another perspective view of the anchor mount of FIG. 6 with an anchor nut and tension cable inserted into slots of the anchor base.
Figures 8, 9, 10:
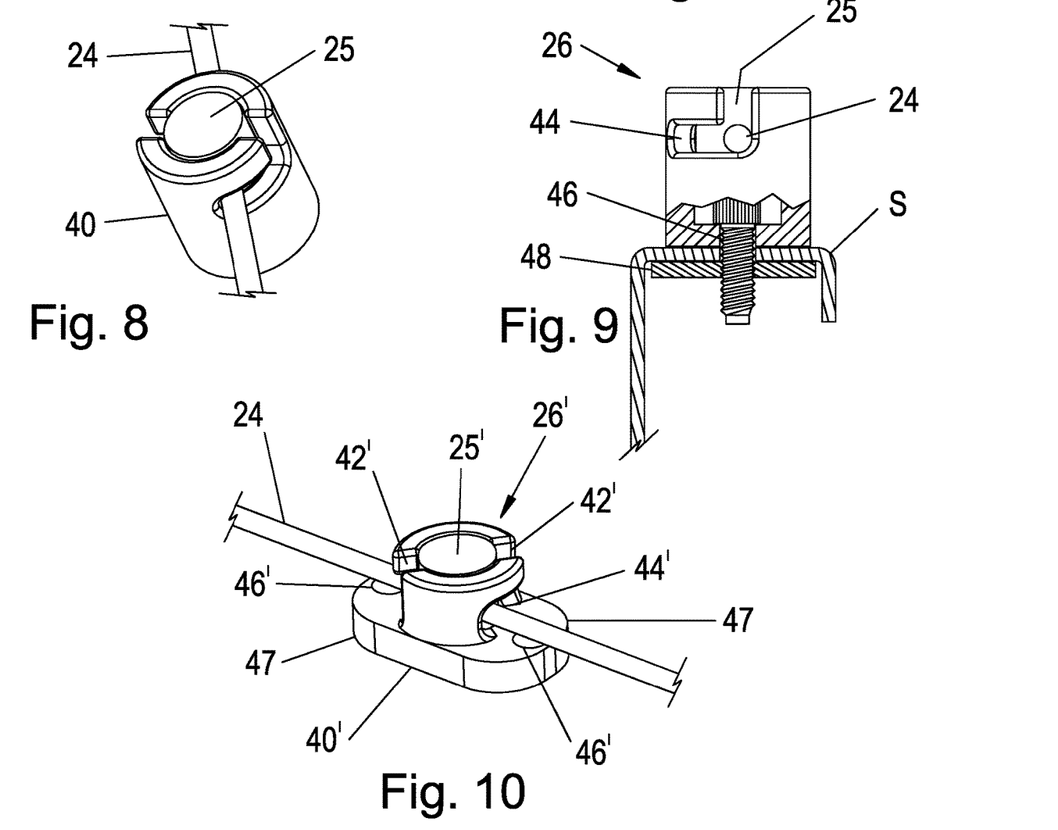
FIG. 8 is another perspective view similar to FIG. 7 but illustrating the anchor nut and tension cable inserted into a locked position in the anchor base.
FIG. 9 is a view partially in section of the anchor base of FIGS. 6 to 8 in an open position.
FIG. 10 is a perspective view of a modified form of anchor mount to that illustrated in FIGS. 6-9.
Figure 11:
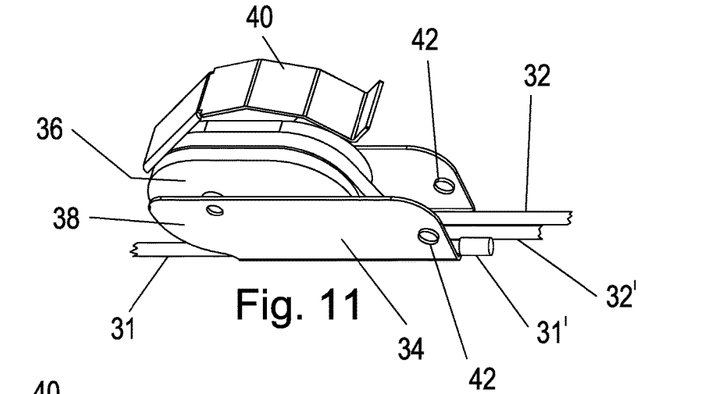
FIG. 11 is a front perspective view of a cable-locking mechanism with its upper cover raised to illustrate the cable ends.
Figure 12:
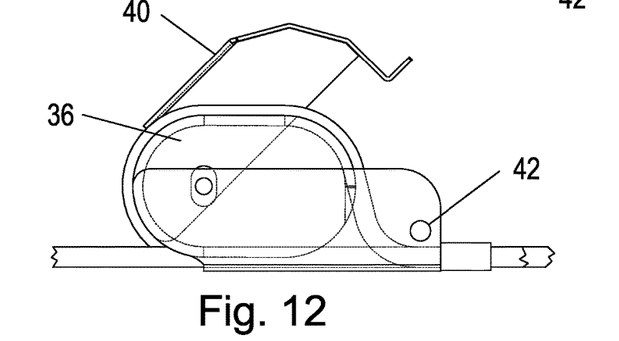
FIG. 12 is a front view in elevation of the locking assembly of FIG. 11 in an open position.
Figure 13:
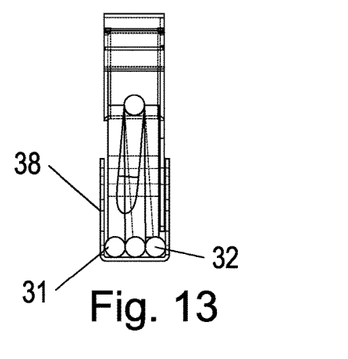
FIG. 13 is an end view of the locking assembly of FIG. 11.
Figure 14:
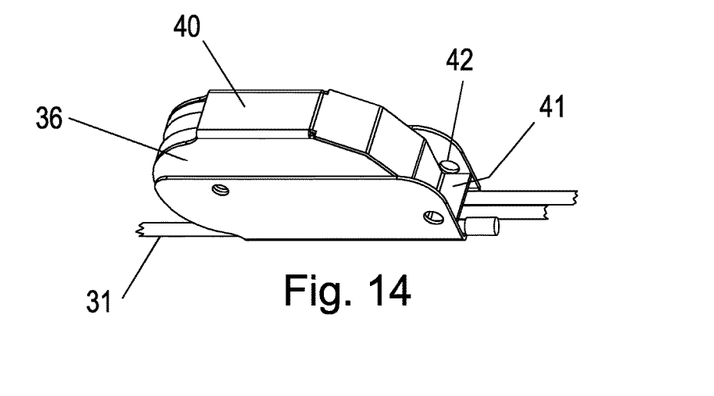
FIG. 14 is another front perspective view of the locking assembly of FIG. 11 with the cover in a closed position.

A modified form of anchor 26' is illustrated in FIG. 10 wherein like parts to FIGS. 6 and 9 are correspondingly enumerated with prime numerals. In this modified form, a pair of bolts 46' extends through openings in opposite ends 47 of the anchor base 40' and are tightened in place by rotation through a pair of nuts in the sidewall rather than a single nut and bolt. The slots 42' are modified by extending for the greater length of the anchor mount and terminate in lateral slot 44' at the base of the cylinder 40'. In this way, when the cable 24 and associated anchor nut 25' is inserted into the slots 42' and 44' it will pass directly over the upper ends of the bolts 46' making it very difficult for someone to loosen the bolts in order to remove the cover.

Depending upon the size of the cover, ordinarily it is sufficient to mount the anchor bolts 40 or 40' at or adjacent to the four corners of the cover. As illustrated in FIG. 5, however, additional anchors 26 may be positioned along the sides between the corners; and in addition, the front end of the cover may be connected by means of a hook 50 to the rear end wall of the cab portion of the vehicle. Although one hook is illustrated it will be apparent that multiple hooks 50 may be employed along the front end. In addition, one or more hooks 52 may be anchored in the floor of the cargo compartment adjacent to the tail gate so that the cable 24 can extend through the hook(s) 52 to close off the rear end of the cover.

The tension cable 24 provides a way to tighten and lock the cover assembly on different parts of a vehicle, such as, in direct surrounding relation to cargo placed in a trunk or cargo area of the vehicle by securing the loose or free ends 31 and 32 to the locking mechanism 34 as illustrated in FIGS. 11-14. In one form, the locking mechanism 34 is comprised of an inner spool 36 composed of a stiff rubber or rubber-like material that is weather resistant and malleable enough to provide compression against the loose ends of the cable when inserted between the spool 36 and outer generally U-shaped housing 38. The housing has an upper pivotal cover 40, and the spool 36 has a series of three grooves a, b and c to receive the ends 31 and 32. One loose end 31 may be inserted between the spool and closed end of the housing 38, and the opposite loose end 32 may be wrapped one or more times around the spool so that the terminal end 32' may be returned in the same direction as the terminal end 31. The end 31 is provided with a ball shank 31' to prevent accidental loosening. Once the free ends are inserted into the lock and the cover 40 of the lock is closed, a padlock or cotter pin, not shown, can be inserted through aligned openings 42 in the U-shaped housing 34. As best seen from FIG. 14 when the cover 40 is in a closed position the end of the cotter pin or padlock bears against the free end 41 of the housing to prevent release of the cover and maintain the necessary compression between the tension block 36 and housing 38. Only when the lock or cotter pin is removed can tension be released on the free ends and permit them to be adjusted or released.

For the purpose of illustration, FIG. 5 illustrates the locking mechanism 34 secured by a bolt in a pocket 34' formed in many vehicles, such as, the Jeep® Wrangler and which will prevent tampering with the locking mechanism when the tail gate is closed. In the alternative, the locking mechanism can simply be placed on the floor of the cargo compartment and, once tightened, will be retracted beneath the cargo and hidden from view. Alternate forms of locking devices which may be employed are the bicycle cable locks and Master Lock Python (Part Number 8418 KADCAMO) manufactured and sold by Master Lock Company LLC, Oak Creek, Wis.

In use as a cargo cover assembly for a vehicle, a rack mount on top of the vehicle or in a trunk area, the tension anchor nuts 25 are pre-installed onto the tension cable 24 as the cable is threaded through the outer looped ends of the security layer. As noted earlier there may be a minimum of four anchor nuts 25 installed on the tension cable 24 at the four corners of the assembly as illustrated in FIG. 1. In order to secure each anchor nut 25, an anchor base 26 and bolt 46 are preinstalled on the sidewall of the vehicle as earlier described and the anchor base 40 assembled onto the bolt 46 with the slots 42 aligned for insertion of the cable and rotation into the lower slots 44 into a fixed or closed position. Once placed under tension by the lock assembly the cable cannot be rotated back to the open position thus providing a secure attachment for the cover assembly. If desired, several anchor nuts 25 can be threaded onto the tension cable 24 depending upon the mounting configuration desired and to provide for multiple points where the cover assembly can be installed.

Figure 18:
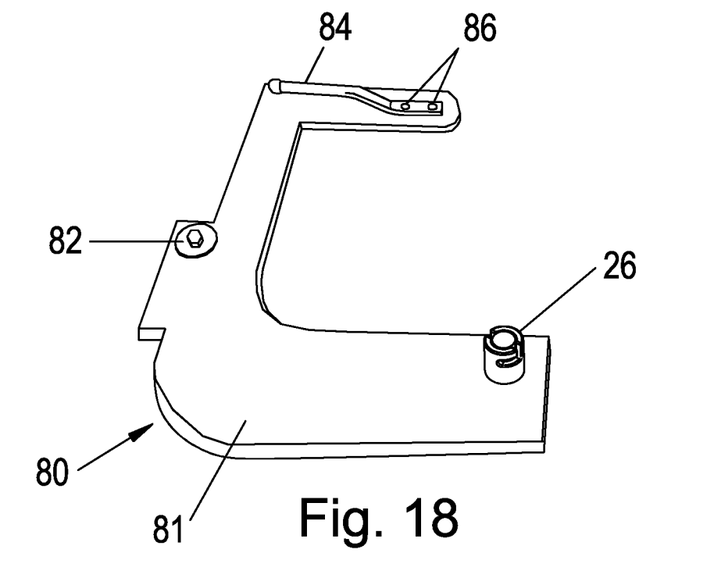
FIG. 18 is a perspective view of a roll bar platform.
Figure 19:
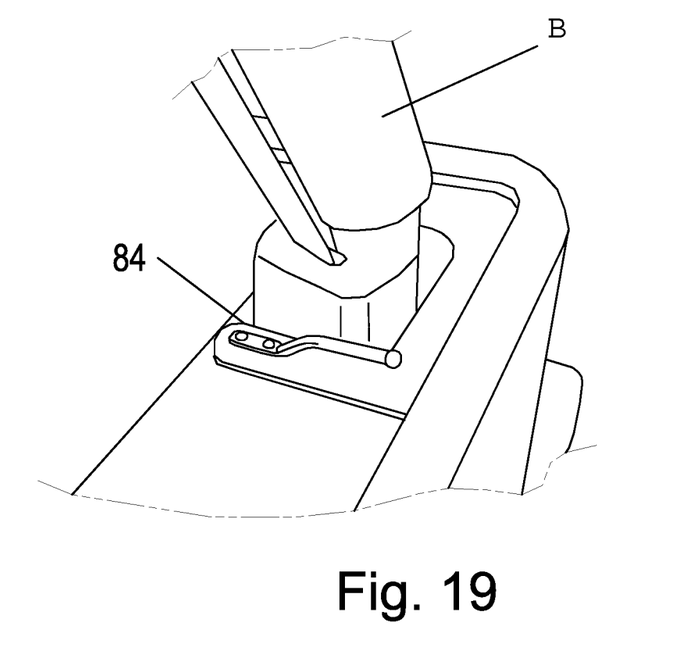
FIG. 19 is a perspective view of the roll bar platform shown in FIG. 18 and mounted in a vehicle.
Figure 20:
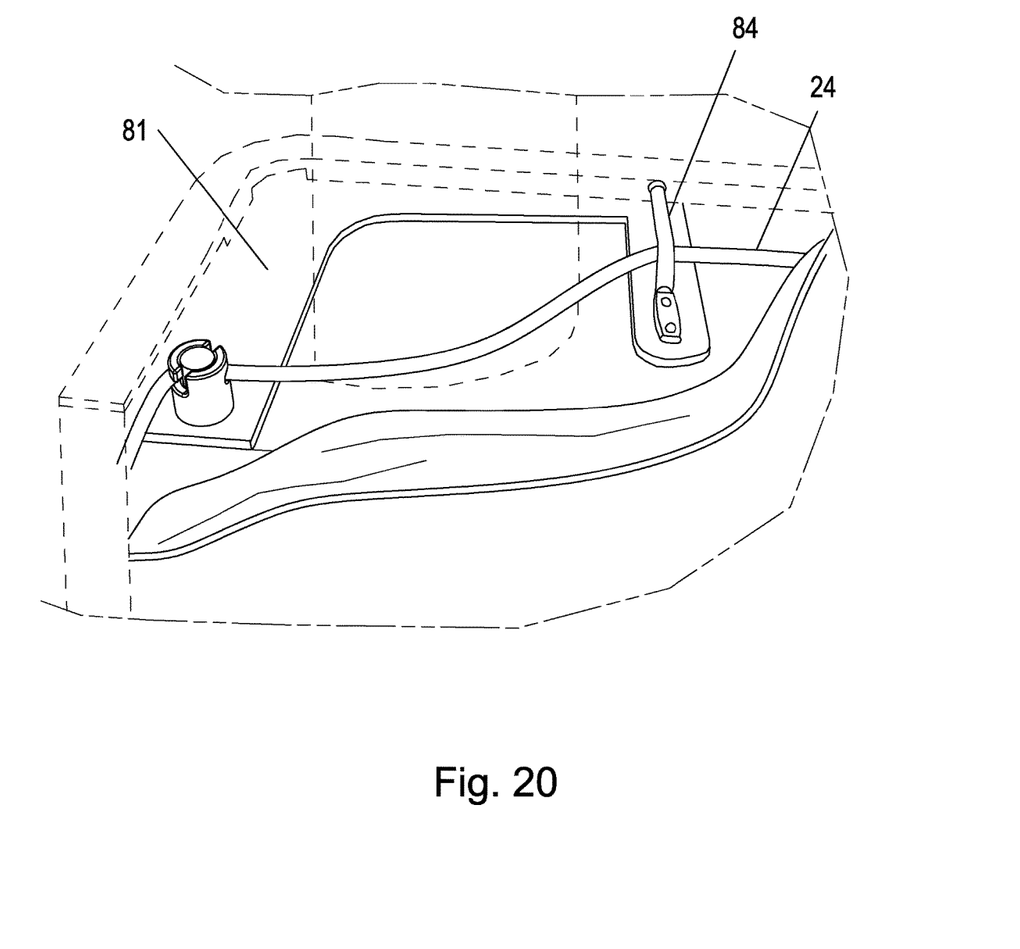
FIG. 20 is a perspective view of the roll bar platform shown in FIG. 18 with a tension cable.

When an anchor as described cannot easily be bolted directly to a vehicle, anchor mounts may be utilized to provide for a secondary place to attach each anchor 40. For example, in an off-road vehicle application, a roll bar with an anchor mount platform can be used to provide an attachment point on the roll bar; or can be bolted to a vehicle to provide a mounting surface on a side or top of a vehicle. This allows the cargo cover to be completely secured to the cargo area. The anchor mount platform for a vehicle having a roll bar is shown in FIGS. 18-20. The roll bar platform 80 has upper and lower surfaces with peripheral edges that are coextensive with surfaces within the vehicle such as a roll bar or side edge. As shown in FIG. 20, the platform 80 partially encircles or surrounds the roll bar B and includes attachment accessories to allow for secure attachment of the cargo cover 10.

The platform 80 can be comprised of one or more base members 81 that are made of metal, fiber board, milled or injection molded plastic which can be secured to the vehicle with one or more bolt members 82. The attachment accessories include a tension cable stay 84 that is secured to the platform 80 with at least one nut and bolt 86 and a tension anchor base 26 as previously described. Once the platform 80 is secured to the vehicle in surrounding relation to the roll bar B, the cover 10 may be secured around the roll bar B, the anchor mounts may be secured and the cable 24 can be guided through the tension cable stay 84 and tension anchor base 26 as shown in FIG. 20. It will be apparent that the tension cable 24 permits a user to place more slack in the system so that the cover assembly can wrap around larger objects. However, when the tension cable does not stay in the same horizontal plane as the tension anchors, it may be possible to twist the tension anchor into the open position and remove the cover. In these situations, the cable stay 84 can be used to maintain tension in the system and prevent unwanted removal. The roll bar platform 80 may also be comprised of two metal plates (not shown) that may be secured to one another with nuts and bolts and then secured to the vehicle with a bolt member 82 as shown previously with the form in FIG. 18.

Figure 15:
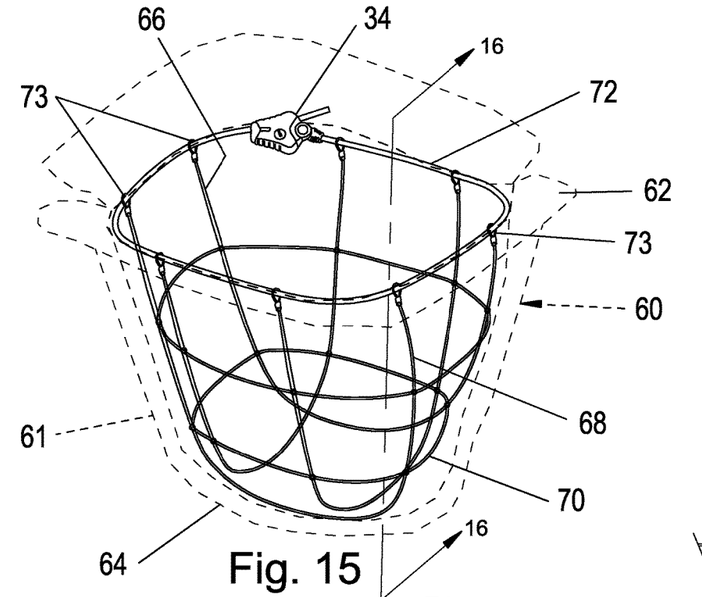
FIG. 15 is a perspective view of a container comprised of the layers making up the assembly of FIG. 1 with the intermediate theft proof layer shown in full.
Figure 16:
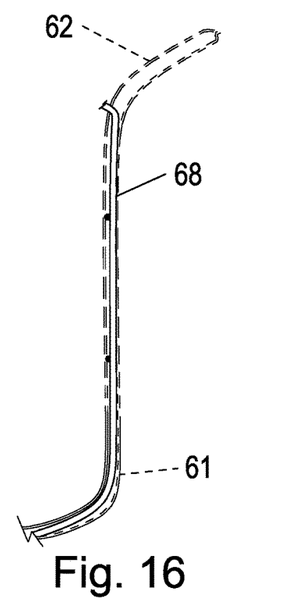
FIG. 16 is a cross-sectional view taken about lines 16-16 of FIG. 15.

In a third embodiment shown in FIGS. 15 and 16 a container or sack 60 is made up of an outer layer 61 composed of a canvas or fabric material and of a generally cylindrical configuration having an upper flared end surface 62 and tapering downwardly into a closed end or bottom surface 64. An inner security layer 66 is comprised of intersecting wires or cables, there being vertically extending, generally U-shaped cables 68 at circumferentially spaced intervals and tapering downwardly across the bottom surface 64 of the outer layer; and generally circular wires 70 are at equally spaced, vertical intervals intersecting the cable 68. In this regard, the layer 61 and the inner cable layer 66 made up of the wires 66 and 68 are of the same construction as the outer layer 16 and middle security layer 18 of the first embodiment; and, depending upon the application, may also be equipped with an inner layer, not shown, similar to the inner layer 12. The uppermost wire rope or cable 72 is of the same construction as the tension cable 24 of the first embodiment with upper looped ends 73 and terminates in loose ends 74, 75. The ends 74, 75 are tightened together by a locking assembly corresponding of the locking assembly 34 of the first embodiment. Alternate forms of locking devices which may be employed are the bicycle cable locks and Master Lock Python (Part Number 8418 KADCAMO) manufactured and sold by Master Lock Company LLC, Oak Creek, Wis. The locking device 34 which is attached to the upper end of the outer layer has one cable end 75 permanently attached to the lock 34 and the opposite end 74 is inserted into the lock 34 and advanced the necessary distance to close the upper, open end of the sack. In addition, wire clips or hog rings R are crimped onto their wires at their points of intersection to prevent shifting between the wires.

Figure 17:
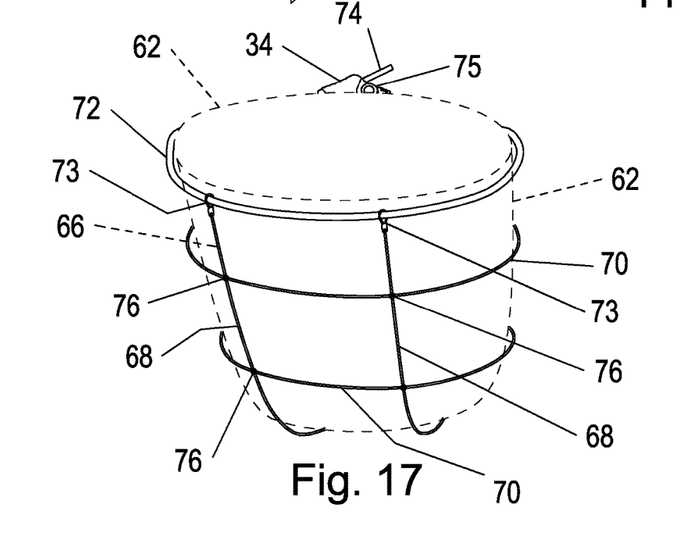
FIG. 17 is a perspective view of a modified form of container to that of FIG. 15 with the intermediate theft-proof layer mounted externally of the container.

A fourth embodiment is shown in FIG. 17 in which the relative size of the security layer and canvas layer of FIGS. 15 and 16 are reversed to that of the third embodiment so that the canvas layer 61 fits inside of the security layer to that of the third embodiment but once again would have a cable lock assembly 34 as shown in FIG. 15. The cable 72 is attached to the inner canvas layer 61 and is threaded through loops 73 of upper ends of the vertical wire strands 68.

Both with respect to the third and fourth embodiments the reinforced sacks are sufficiently flexible or pliable to fit within the pocket of a back pack and when removed from the back pack can be tightened and locked to stationary article such as a bicycle rack.

The third and fourth embodiments are shown as a type of bag enclosure into which items can be placed and locked. However, these embodiments can also be reversed so that the entire cover can be placed over an object to keep locked and protected from view and/or environmental conditions. In this case, a "pillow case" style cover can be placed over an object such as a bicycle locked on a car rack, used as a lockable motorcycle or car cover, or as a stand-alone lockable cargo cover used to cover such items as stereo equipment on an outdoor patio. In these embodiments, the lockable tension cable is sufficient to lock the cover. As such, tension anchors and nuts and bolts are not necessary.

The foregoing description has been presented for purposes of illustration and description. It is not intended to be exhaustive nor to limit the method and system to the precise forms disclosed. Many alternatives, modifications, and variations will be apparent to those skilled in the art in light of the above. Accordingly, the method and system disclosed are intended to embrace all alternatives, modifications, and variations that fall within the spirit and broad scope of the claims.

I claim:

1. A cut-resistant protective covering for a cargo area comprising:
    a flexible layer comprised of strands of wire or cable intersecting one another and having terminal ends:
    a connecting cable extending at spaced intervals and connecting said terminal ends;
    a locking member for tightening terminal free ends of said connecting cable;
    anchor bases attached at spaced intervals to a mounting platform of a cargo area;
    said mounting platform having bolt holes at spaced intervals for said anchor bases; and
    said anchor bases each including an upper slotted end for insertion of said cable and a downwardly extending bolt inserted through openings and threadedly connected to said platform.

2. A protective covering according to claim 1 wherein a third layer is attached to a first layer with said flexible layer inserted between said first and third layers.

3. A protective covering according to claim 2 wherein a third flexible layer comprised of soft material is sewn to said first flexible layer with said second flexible layer sandwiched between said first and second flexible layers.

4. A protective covering according to claim 2 wherein said third layer is composed of a material selected from leather, fabric and plastic.

5. A protective covering according to claim 2 wherein said flexible layer is entirely encased within said first and third layers.

6. A protective covering according to claim 1 wherein said flexible layer comprises connecting strands of wire or cable extending at spaced intervals from the outer periphery of said flexible layer for extension through eyelets.

7. A protective covering according to claim 1 wherein said strands are attached to one another at their intersections.

8. A protective covering for articles stored in a cargo area or trunk of a motor vehicle comprising:
    a first flexible layer of fabric or plastic material;
    a second flexible layer comprised of strands of wire or cable intersecting one another and terminating in free ends, said second flexible layer being substantially coextensive with and superimposed on said first flexible layer;
    a third flexible layer attached to said first flexible layer with said second flexible layer sandwiched between said first and third flexible layers;

eyelets spaced along borders of one of said flexible layers; and a length of cable in outer spaced surrounding relation to said second layer, said cable terminating in free ends, and a locking member to which said free ends are connected for tightening said first, second and third layers around the stored articles;

anchor bases attached at spaced intervals to outer walls of a cargo area;

said outer walls having upper ledges with bolt holes at spaced intervals for said anchor bases; and said anchor bases each including an upper slotted end for insertion of said cable and a downwardly extending bolt inserted through openings and threadedly connected to said outer walls.

9. A protective covering according to claim 8 wherein said cable is insertable through said free ends of said second layer.

10. A protective covering according to claim 8 wherein said anchor bases are attached to said cargo area in outer circumferentially spaced relation to said stored articles, said cable being attached to said anchor bases.

11. A protective covering according to claim 10 wherein said anchor bases are connected at locations aligned with corners of said first and second layers.

12. A protective covering according to claim 11 wherein said anchor bases each include an upper cylinder portion being rotatable on said bolt into fixed engagement with said upper ledge of said wall.

13. A protective covering according to claim 10 wherein each of said anchor bases includes a base member having a pair of bolt openings aligned with spaced openings in said upper ledge, and a pair of threaded bolt members in said spaced openings for threaded engagement with said upper ledge.

14. A protective covering according to claim 10 wherein each of said anchor bases includes a cylinder and a pair of slots in diametrically opposed relation to one another, each of said slots extending in an axial direction and terminating in a radial slot, said cable being insertable through said axial slots and rotated in said radial slots to prevent release from each said cylinder when said cylinder is in locking engagement with said ledge.

15. A cut-resistant article cover comprising: a first flexible layer of a fabric or plastic material;

a second flexible layer comprised of strands of wire or cable intersecting one another and coextensive with and conforming in size and configuration with said first layer:

connecting strands extending from one side of said second flexible layer and each strand terminating in a connecting end member;

a cable extending through said connecting end members, said cable terminating in loose, free ends; and a locking member for tightening said loose ends of said cable; anchor bases attached at spaced intervals to outer walls of a cargo area;

said outer walls having upper ledges with bolt holes at spaced intervals for said anchor bases; and said anchor bases each including an upper slotted end for insertion of said cable and a downwardly extending bolt inserted through openings and threadedly connected to said outer walls, and an upper cylinder portion being rotatable on said bolt into fixed engagement with said upper ledge of said wall.

16. The article cover according to claim 15 wherein a third flexible layer comprised of soft material is sewn to said first flexible layer with said second flexible layer sandwiched between said first and third flexible layers.

17. The article cover according to claim 15 wherein said first and second layers are of generally rectangular configuration.

18. The article cover according to claim 17 wherein said second layer is in outer surrounding relation to said first layer and a third layer is composed of a material selected from leather, fabric and plastic.

19. The article cover according to claim 15 wherein said first flexible layer includes eyelets spaced around and extending through the outer periphery of said first layer.

20. The article cover according to claim 15 wherein said second flexible layer is comprised of intersecting wires or cables.

* * * * *